United States Patent [19]

Black

[11] 4,011,652
[45] Mar. 15, 1977

[54] METHOD FOR MAKING A PIPE COUPLING
[75] Inventor: Bobby E. Black, Chatsworth, Calif.
[73] Assignee: PSI Products, Inc., Burbank, Calif.
[22] Filed: Apr. 29, 1976
[21] Appl. No.: 681,423
[52] U.S. Cl. .............................. 29/455 R; 29/458; 29/460; 29/516; 29/525; 285/53; 285/292
[51] Int. Cl.$^2$ .................. B21D 39/00; B23P 19/04
[58] Field of Search ............ 29/460, 516, 525, 458, 29/451, 455; 285/53 X, 292 X, 347, 294

[56] References Cited

UNITED STATES PATENTS

| 2,716,623 | 8/1955 | Tator | 285/294 X |
|---|---|---|---|
| 3,284,110 | 11/1966 | Marcus et al. | 285/292 X |
| 3,432,186 | 3/1969 | Braun | 29/458 X |
| 3,434,900 | 3/1969 | Bender | 29/460 X |
| 3,871,687 | 3/1975 | Dockree | 285/53 |
| 3,892,032 | 7/1975 | Bagnulo | 29/455 |

Primary Examiner—Charlie T. Moon
Attorney, Agent, or Firm—Spensley, Horn & Lubitz

[57] ABSTRACT

The present invention is a method for making an electrically insulative coupling which is inserted between and coupled to two lengths of metallic pipe. The method comprises the steps of machining one end of two short sections of metallic pipe to provide a circumferential groove, inserting O rings onto the grooves, inserting the machined ends of the pipe sections into a central sleeve, injection moulding an outer insulative sleeve over the machined pipe ends and central sleeve, and pressing a metal outer sleeve over the outer insulative sleeve. By this method the electrically insulative coupling is manufactured quickly and inexpensively.

9 Claims, 3 Drawing Figures

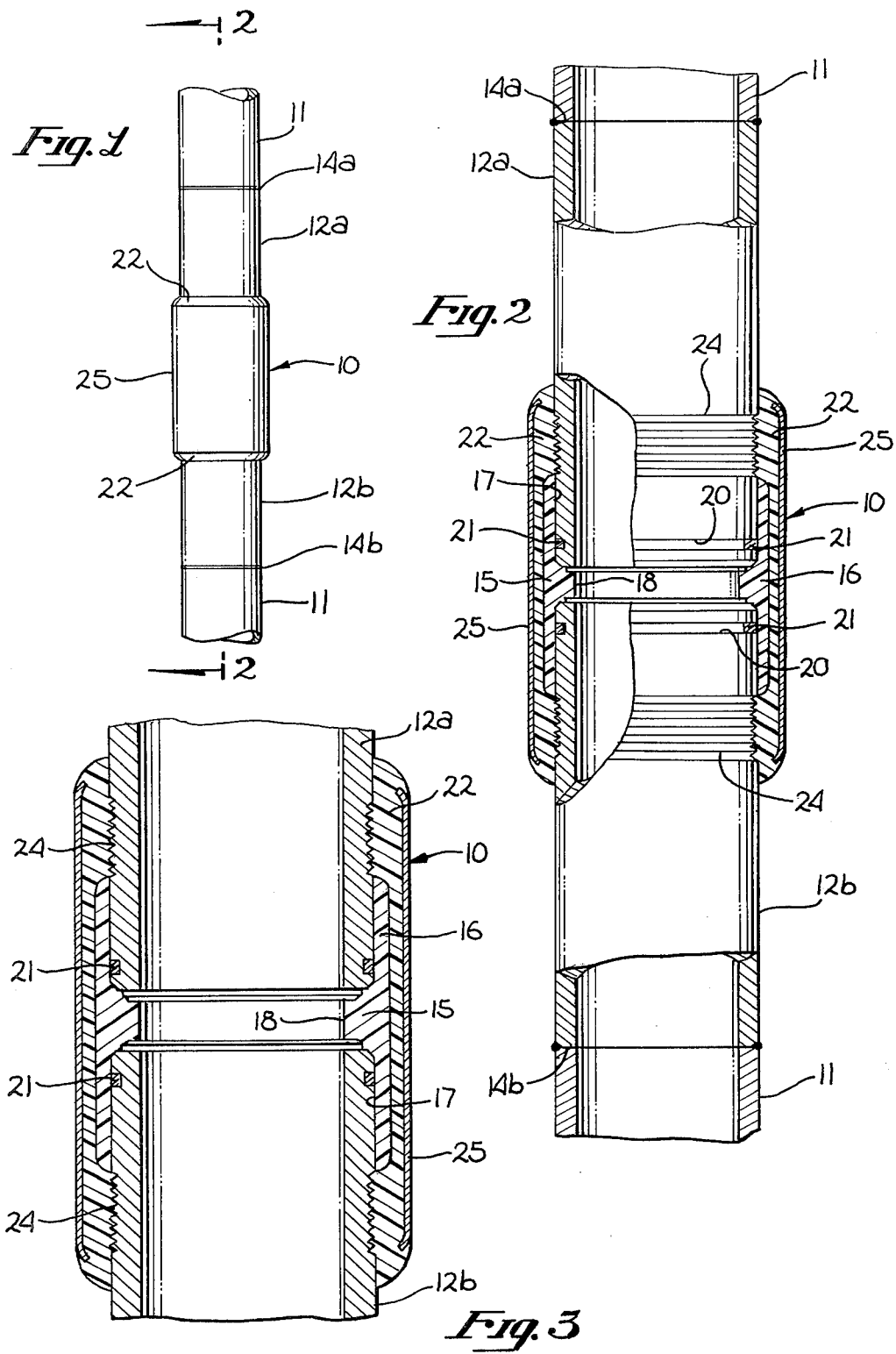

4,011,652

METHOD FOR MAKING A PIPE COUPLING

FIELD OF INVENTION

This invention relates to methods for making pipe couplings and more particularly to methods for making a coupling to be inserted into a pipeline to electrically isolate sections of pipe.

DESCRIPTION OF THE PRIOR ART

In many pipeline applications it is necessary to electrically insulate one section of pipe from another. For example, in gas transmission lines it is necessary to cathodically protect the main or trunk lines by elaborate cathodic protection means to govern the flow of electrons in the pipe to prevent rusting of the pipe, and extend its use for life. Such cathodic protection can be eliminated or seriously impaired if a branch line is not cathodically protected and is connected to the main line in electrical contact with the main line. It is necessary therefore to provide some electrical isolation between the branch line and the main line. Such means for providing this electrical isolation include flanges with insulating gaskets and pipe connectors similar to that shown in U.S. Pat. No. 3,871,687 issued on Mar. 18, 1975.

The pipe connector described in U.S. Pat. No. 3,871,687 appears to be the best available solution to the problem, but the method of manufacture of said pipe connector is extremely slow. In particular, the pipe connector is manufactured pursuant to a method which requires that the outer insulative sleeve be cast from some polyester resin. Typically, casting of polyester resins takes a relatively long time.

Accordingly, it is a general object to the present invention to provide a method to make an insulative pipe connector which requires a relatively short period of time.

It is still another object of the present invention to provide a method for manufacturing a insulative pipe connector which is relatively simple.

It is yet another object of the present invention to provide a method for manufacturing an electrically insulative pipe connector having a fluid seal which retains its integrity under bending stresses.

SUMMARY OF THE INVENTION

In keeping with the principals of the present invention, the objects are accomplished by the unique method comprising the steps of machining one end of two short sections of metallic pipe to provide a circumferential groove, inserting an O-ring onto each of the grooves in each of the pipes, inserting the machined ends of the pipe sections into a central sleeve, injection molding an outer insulating sleeve over the machined pipe ends and center sleeve, pressing a metal outer sleeve over the outer insulative sleeve, and crimping the ends of the outer metal sleeve such that the metal sleeve cannot be removed from the outer insulating sleeve. By this method an electrically insulative pipe coupling is manufactured quickly and inexpensively.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which:

FIG. 1 is a view in elevation showing the coupling of the present invention in place in a pipeline:

FIG. 2 is a sectional view in elevation of the presently preferred embodiment of the present invention; and FIG. 3 is a sectional view of the center section of the coupling in FIG. 2.

DESCRIPTION OF THE PREFERRED EMBODIMENT

Referring to the Drawings, there is shown in FIG. 1 a coupling 10 of the present invention installed in the length of pipe 11. The coupling is shown disposed between adjacent ends of steel pipe which may typically be a branch line in a gas transmission system. The coupling is adaptable to pipes of all diameters and its length is dependent upon such diameter. The length is not critical, the only requirement being that the overall length be sufficient that welding operations at the ends of the coupling may not be harmful to the plastic components of the coupling. For ease of transport and factory assembly, the length is held to a reasonable minimum within that requirement. As for example in 4 inch pipe, the overall length of the coupling is 24 inches.

The coupling 10 includes two pipe stubs 12a and 12b, which are preferably of the same diameter and wall thickness as the pipe into which the coupling is to be inserted. The outside ends of the pipe stubs are preferably beveled to facilitate welding. As shown in FIG. 1, the opposite ends of the pipe stubs are welded at 14a and 14b to adjacent ends of the pipeline.

Referring to FIGS. 2 and 3, shown therein are the details of the pipe coupling. The center section 15 of the coupling is shaped generally as a cylindrical sleeve 16 with the inside wall 17 having a diameter approximately equal to, but greater than the outside diameter of pipe stubs 12a and 12b. Approximately at the midpoint of inside wall 17 there is formed a radially inward protuberance 18. The transverse protuberance 18 is generally toroidal and of rectangular cross-section. It extends inwardly approximately to the inside diameter of the pipe stubs 12a and 12b. The adjacent ends of the pipe stubs 12a and 12b thus fit into the sleeve and abut against the transverse portion 18 of the center section. The inside walls of the pipe stubs and transverse sections 18 define a continuous conduit through the coupling. The longitudinal thickness of the transverse section will vary with the diameter of the pipe and the material from which the center section is formed. It is only required that the longitudinal thickness be sufficient to provide the required electrical insulation between the pipe stubs 12a and 12b. The material from which the center section can be formed is any rigid or semi-rigid insulative material such as plastic having a good electrical insulating property. In the preferred embodiment the center section 15 is injection molded from a suitable plastic such as polyterephthalate by any conventional injection molding machine such as that shown and described in *Polymers and Resins* by Brace Golding, and published by D. Van Nostrand Company, Inc., Princeton, New Jersey in 1959 at pages 590 through 592.

Before pipe stubs 12a and 12b are inserted into center section 15, the ends of pipe stubs 12a and 12b are machined for roundness and an O-ring groove 20 is machined in the outside wall of pipe stubs 12a and 12b approximate the ends thereof. The O-ring groove 20 formed in the outside walls of pipe stubs 12a and 12b is formed near enough to the end of the pipe stubs 12a and 12b such that when inserted into center section 15, it is within the confines of the inside wall 17 of sleeve 16. O-rings 21 are then inserted onto the O-ring grooves 20. O-rings 21 in the grooves 20 provide a fluid seal between the center section 15 and the pipe stubs 21a and b which will maintain fluid integrity even under bending stresses.

Surrounding the center section 15 of the coupling is an outer sleeve 22. The outer sleeve 22 is injection molded about the pipe stubs 12a and 12b and center section 15. In the injection molding process, the pipe stubs 12a and 12b together with center section 15, are placed inside the injection mold with the ends of pipe stubs 12a and 12b projecting out of the mold. As in the case of the center section, the outer sleeve 22 is formed from a rigid, semi-rigid plastic having good electrical insulating properties such as polyterephthalate. For additional mating and bonding of the exterior sleeve 16 to the outside wall of pipe stubs 12a and 12b, circumferential grooves 24 are formed in the outer wall of pipe stubs 12a and 12b. The grooves 24 are parallel circumferential grooves into which the plastic of outer sleeve 15 extends. The pipe stubs 12a and 12b therefore cannot be pulled out of the outer sleeve 22 nor rotated out of position, and the coupling cannot be opened without destroying the outer sleeve 22.

A steel reinforcing sleeve 25 encloses the outer wall of the outer sleeve 22 for additional strength, rigidity and abrasion resistance. The steel reinforcing sleeve 25 is manufactured separately from the pipe coupling and is pressed over the outer sleeve 22 using a conventional hydraulic press or the like. In addition, the ends of the steel reinforcing sleeve 25 are crimped, swedged, or curled to prevent the sleeve from being pulled off the outer sleeve 22. In practice, the ends of metal sleeve 25 can be crimped, swedged, or curled after the reinforcing sleeve after the reinforcing sleeve 25 has been pressed onto the exterior section 22 by a press, or can be crimped, swedged or curled by the hydraulic press during the operation of pressing the reinforcing sleeve 25 onto the sleeve 22.

Accordingly, it can be seen that the coupling manufactured pursuant to the process of the present invention provide electrical isolation between the sections of the pipe into which it is inserted. Furthermore, the coupling maintains fluid integrity and neither the electrical nor fluid integrity of the coupling can be violated without the destruction of the coupling. Furthermore, it can be seen that the process for making a coupling of the present invention provides a simple method of process for making a coupling which requires a relatively short period of time.

In all cases it is understood that the above-described embodiment is really illustrative of but one of the many possible specific embodiments which represent the application of the principles of the present invention. Furthermore, numerous and varied other arrangements can be readily devised in accordance with the principles of the present invention by those skilled in the art without departing from the spirit and scope of the invention.

I claim:

1. A method for making an insulative pipe coupling comprising the steps of:
   forming an o-ring circumferential groove adjacent the end of two pipe stubs;
   inserting an o-ring onto each of said grooves;
   inserting said pipe stub ends with said o-ring into a center insulating sleeve;
   injection moulding an outer insulative sleeve over said center sleeve and said pipe ends; and
   pressing a metal outer sleeve onto said outer insulative sleeve.

2. A method for making a pipe coupling according to claim 1 further comprising the step of crimping the ends of said metal outer sleeve thereby preventing said outer sleeve from slipping off said outer, insulative sleeve.

3. A method for making a pipe coupling according to claim 2 further comprising the step of forming a plurality of circumferential grooves in said pipe stubs subjacent said outer insulating sleeve whereby said pipe stubs cannot be pulled out of said outer insulative sleeve without destroying said outer insulative sleeve.

4. A method for making a pipe coupling according to claim 2 further comprising the step of injection moulding said center, insulative sleeve.

5. A method for making a pipe coupling according to claim 4 wherein said outer and inner insulative sleeves are injection moulded from an electrically non-conductive plastic.

6. A method for making a pipe coupling according to claim 5 wherein said electrically non-conductive plastic is polyterephthalate.

7. A method for making a pipe coupling according to claim 1 further comprising the step of swedging the ends of said metal outer sleeve.

8. A method for making a pipe coupling according to claim 1 further comprising the step of curling the ends of said metal outer sleeve.

9. A method for making a pipe coupling according to claim 2 wherein said ends of said outer metal sleeve are crimped while said metal outer sleeve is pressed onto said outer insulative sleeve.

* * * * *